United States Patent Office 3,065,588
Patented Nov. 27, 1962

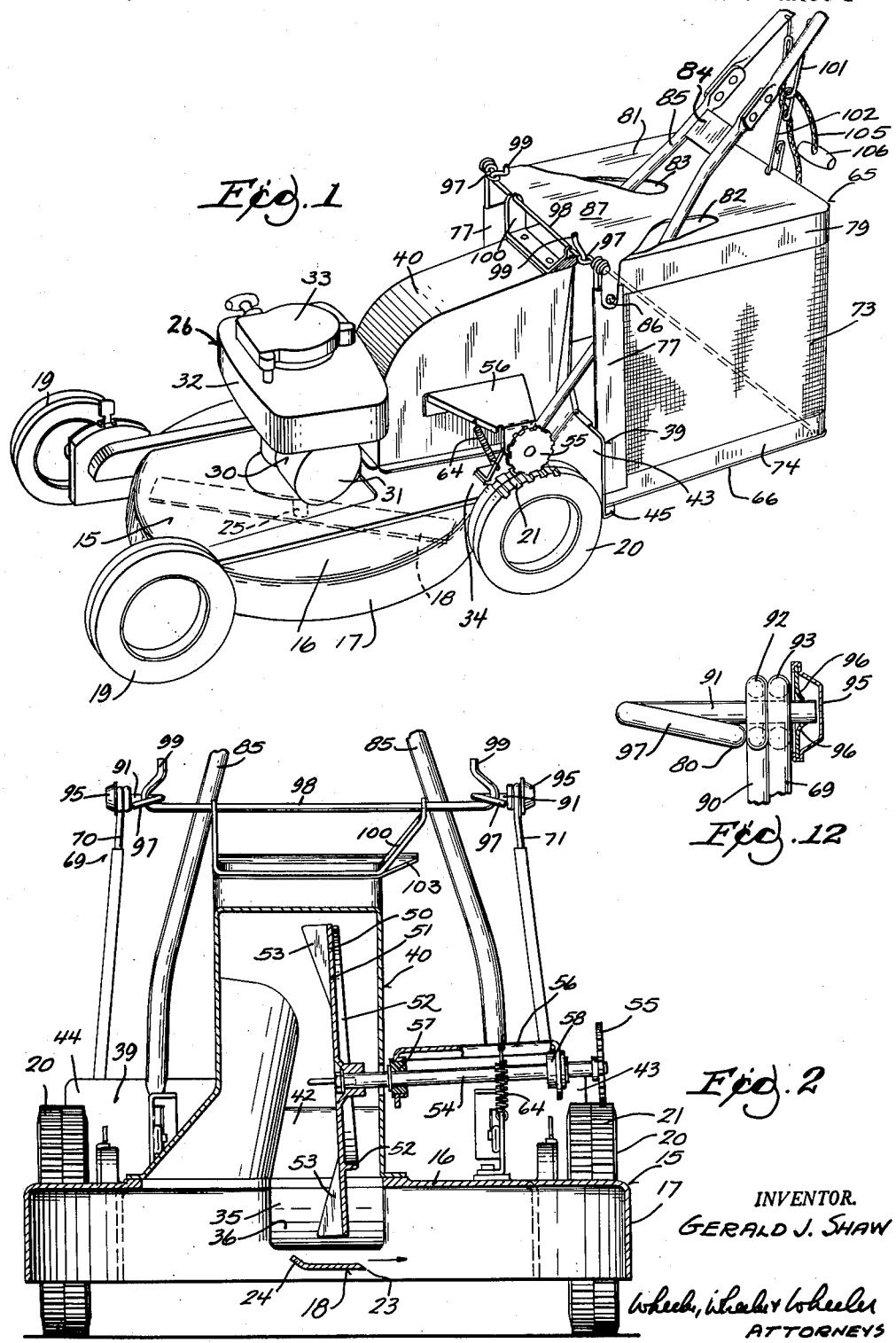

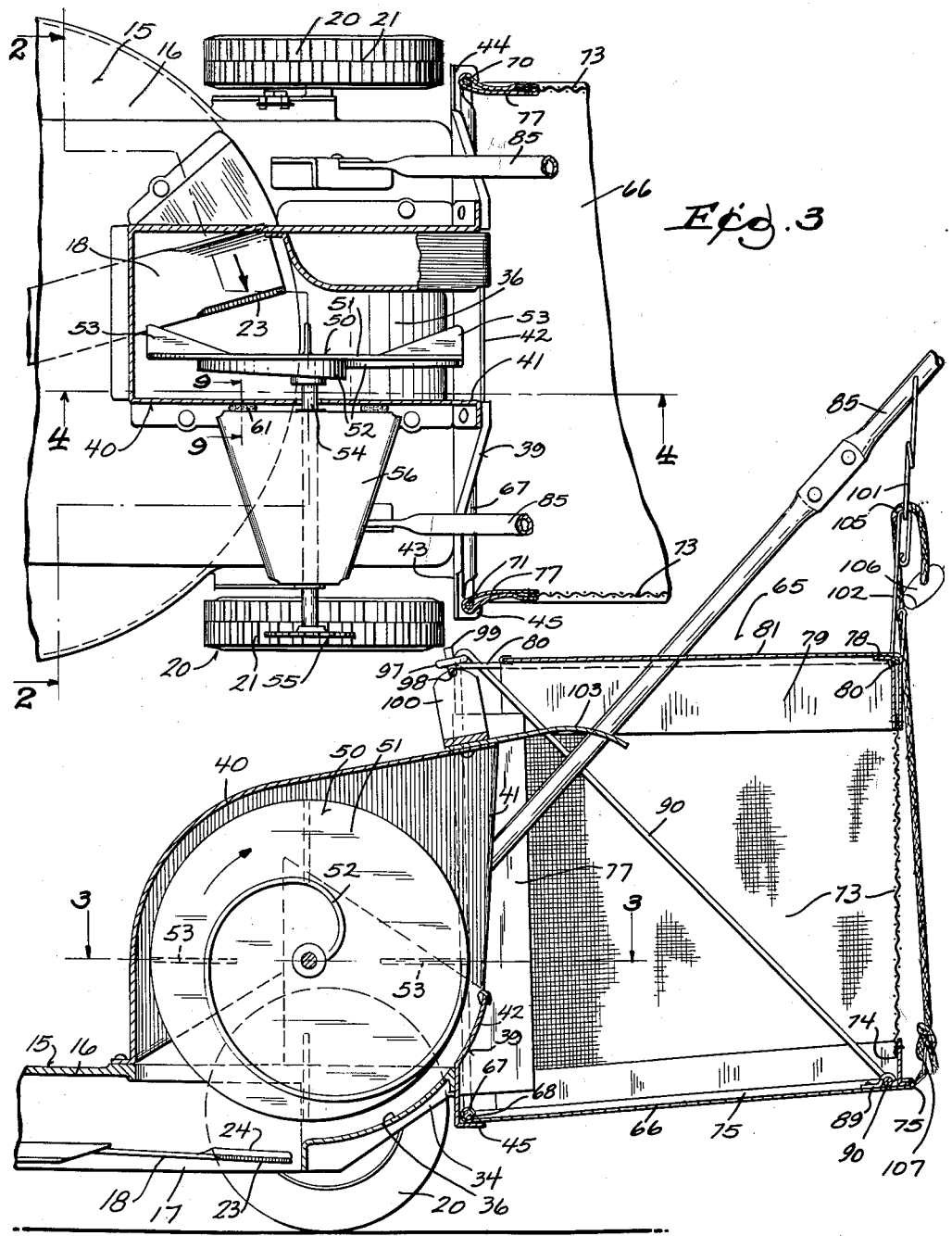

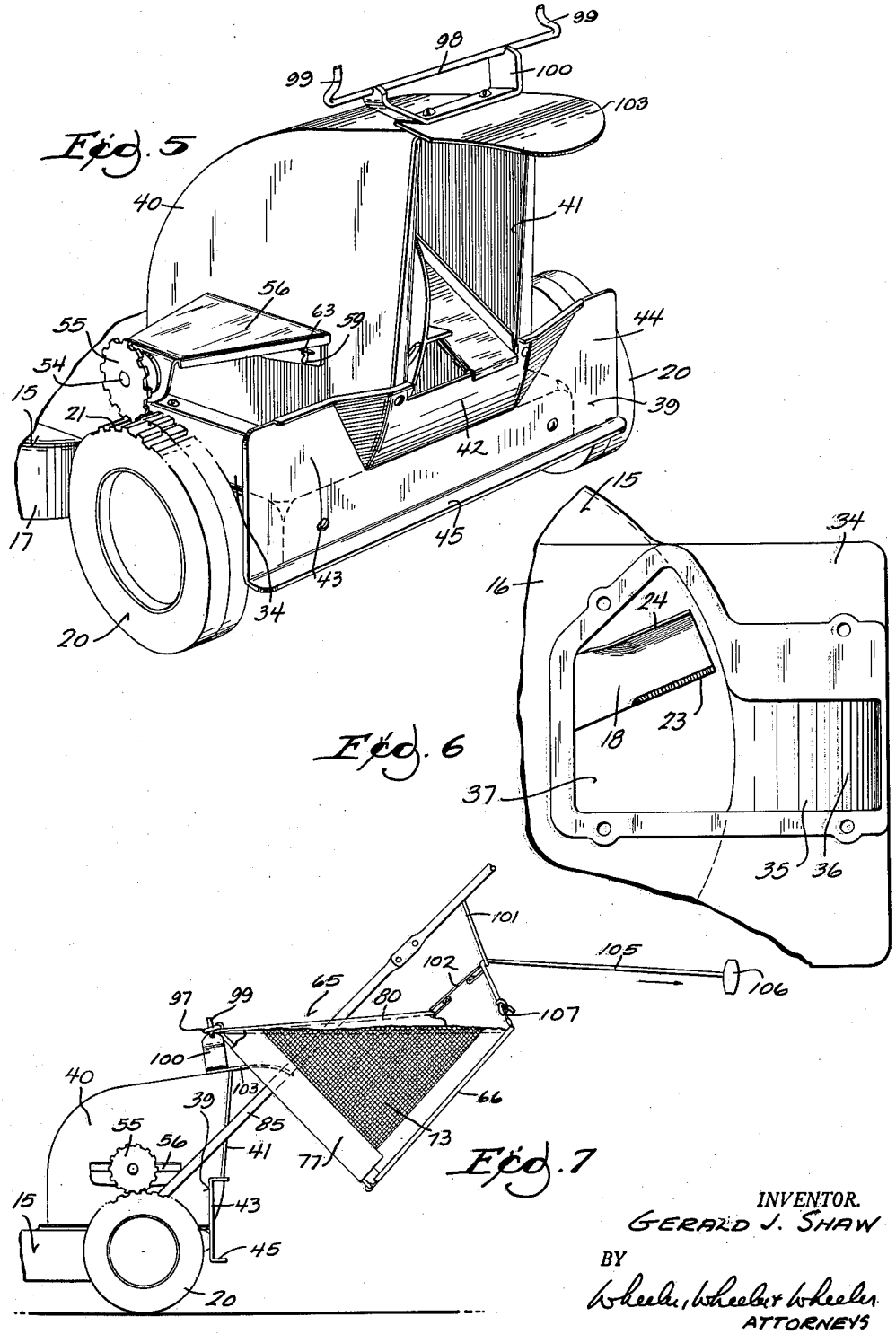

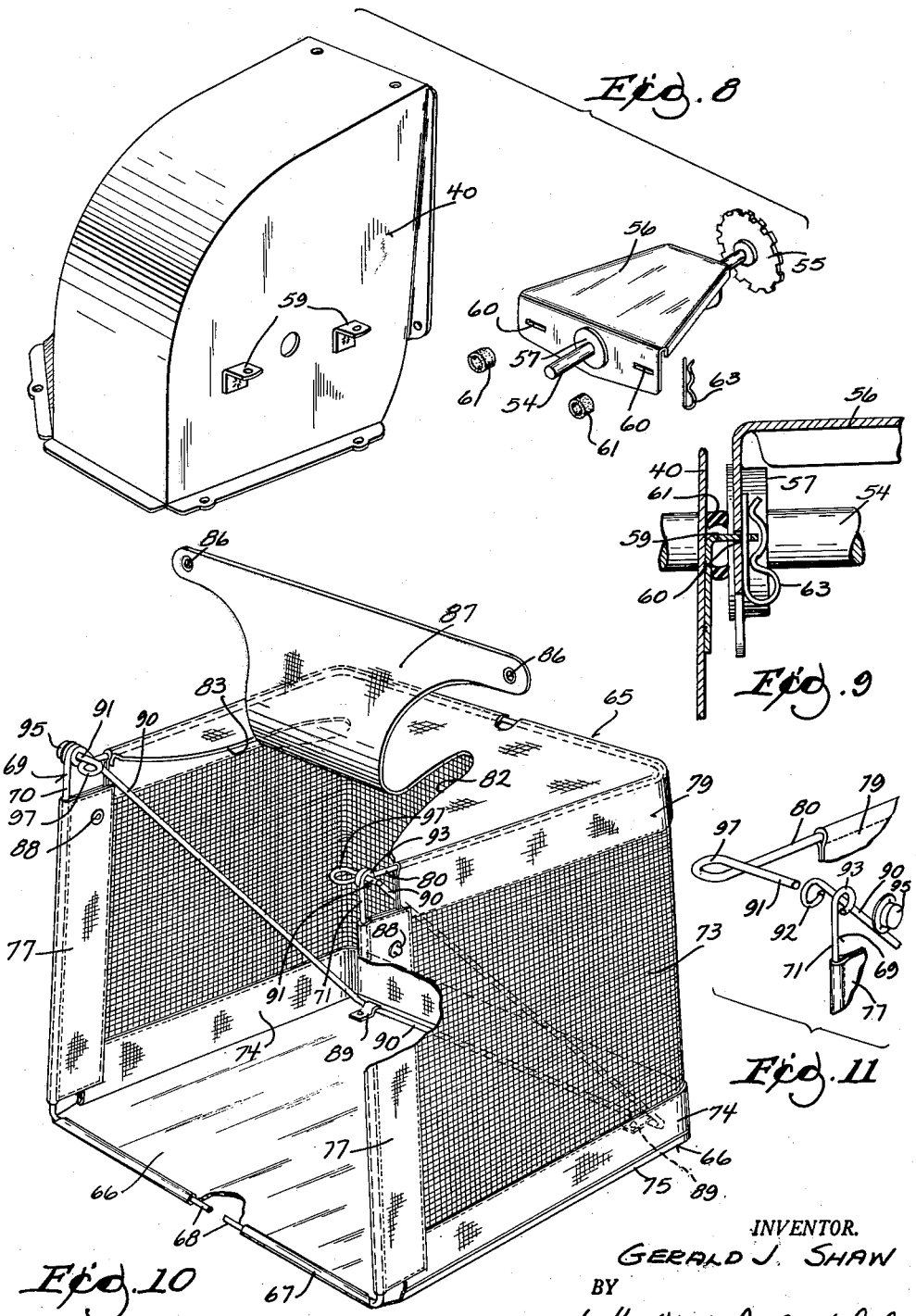

3,065,588
ROTARY MOWER WITH GRASS CATCHER
Gerald J. Shaw, Lamar, Mo., assignor to Outboard Marine Corporation, Waukegan, Ill., a corporation of Delaware
Filed Apr. 25, 1960, Ser. No. 24,575
7 Claims. (Cl. 56—25.4)

This invention relates to a rotary mower with grass catcher.

The rotary mower embodying the invention has enhanced safety because the casing in which the rotary knife operates lacks the usual tangential outlet. There is no access to the outlet from the blade housing of the present mower other than the upwardly opening orifice behind the engine which is covered by an auxiliary casing communicating with the grass catcher, there being a rotary feeder operating in the auxiliary casing to facilitate delivery of the clippings upwardly and rearwardly into the grass catching bag.

The grass catching bag is suspended in part from the mower handle and in part from the auxiliary casing, there being a pivotal connection to the latter which permits the catching bag to be tilted upwardly and rearwardly for the purpose of discharging accumulated clippings. A novel system of interlocking stays supports the bag in normally open position but permits it to be collapsed for storage, while also accommodating its pivotal movement as above described.

The rotary feeder is driven from one of the wheels and has a shaft which, together with its supporting bearings, is bodily pivoted from the wall of the auxiliary casing and the rotor is held under spring pressure in operative driven engagement with the mower wheel from which it derives its power.

In the drawings:

FIG. 1 is a view in perspective of a mower equipped with a grass catcher in accordance with this invention, the handle being fragmentarily illustrated.

FIG. 2 is a view taken in section on line 2—2 of FIG. 3.

FIG. 3 is a view fragmentarily showing portions of the mower in plan, the auxiliary casing and the fragmentarily illustrated catcher being shown in section on the line 3—3 of FIG. 4.

FIG. 4 is a view fragmentarily illustrating portions of the mower and the catcher in longitudinal section on the line 4—4 of FIG. 3.

FIG. 5 is a fragmentary detail view of the mower on an enlarged scale and auxiliary casing in rear and three-quarter perspective.

FIG. 6 is a fragmentary plan view of the mower on an enlarged scale showing the area to which the auxiliary casing is applied.

FIG. 7 is a fragmentary detail view of the mower in side elevation showing the catcher pivoted to the position in which it discharges accumulated clippings.

FIG. 8 is a view in perspective on an enlarged scale illustrating in mutually separated positions the auxiliary casing and the rotary feeder drive shaft with its supporting structure.

FIG. 9 is an enlarged fragmentary detail view taken in section on the line 9—9 of FIG. 3.

FIG. 10 is an enlarged detail view of the grass catcher in three-quarter front perspective, portions being broken away.

FIG. 11 is a fragmentary detail view showing in perspective the mutually separated positions of the separate stays provided for the support of the grass catching bag.

FIG. 12 is a further enlarged detail view partially in front elevation and partially in section showing in assembled relationship parts which are shown in separated position in FIG. 11.

In accordance with generally conventional practice, the mower comprises a blade housing 15 having the general form of an inverted pan with a platform 16. An unbroken side flange 17 encloses the blade 18.

The platform is supported in any desired way by means of the wheels 19 and 20, the latter, at least, having transversely toothed treads as shown at 21 in FIG. 2 and FIG. 5.

The blade 18 desirably has a sharpened forward margin 23 and an upturned flange 24 on its trailing margin as best illustrated in FIG. 2. It is mounted in a known manner on a drive shaft 25 of an engine 26 carried by the platform 16. The engine power head 30 includes, in conventional manner, a cylinder 31, fuel tank 32 and starter 33, none of these items being directly concerned with the present invention.

Between the rear wheels 20 the platform 16 of the blade housing 15 is extended rearwardly at 34 and provided with a grass discharge opening at 35 having an upwardly curved bottom wall 36 as best shown in FIGS. 4 and 6. That portion 37 of the opening 35 which is in the platform 16 has substantial arcuate extent overlying the path of the blades 18 as shown in FIGS. 3 and 6.

Bolted to the blade housing 15 and completely enclosing the opening portions 35 and 37 is an auxiliary casing 40 which has a rearward opening 41. Secured to housing portion 30 and casing 40 is a plate 39 providing a bottom wall 42 curving upwardly toward opening 41 as an extension of curvilinear wall 36 above described. Plate 39 has laterally extending wings 43 and 44 and also provides the projecting horizontal flange 45 on which the lower margin of the grass catching bag seats when in use.

Within the auxiliary casing 40 there is a rotary feeder 50 which comprises a disk 51 having a helical rib 52 on one of its faces and having radial vanes 53 on the face toward which clippings tend to be propelled by the blades 18 as they pass beneath the portion 37 of the opening in the blade housing 15. The rotary feeder is mounted on a feeder shaft 54 having a driving rotor 55 that is toothed to mesh with the ribs or teeth 21 of one of the rear wheels 20 in the manner best shown in FIGS. 1, 3 and 5. A pivotally floating bracket 56 is provided with bearings at 57 and 58 for the feeder shaft 54. The entire bracket is pivoted to the auxiliary casing 40 upon apertured lugs 59 which project from the auxiliary casing 40 through the slots 60 which are provided in the end of bracket 56 (see FIGS. 8 and 9).

Tubular cushions 61 of elastomeric material are slipped over the respective lugs 59 and are compressed to the form shown in FIG. 9 when the bracket 56 is engaged with the lugs and held in pressure contact with the cushions 61 by the cotter pins 63 inserted through the apertures of the lugs.

A spring 64 connected with the pivotally floated bracket 56 and further connected with handle bracket 84 and thereby with the platform 16 of blade housing 15 exerts downward tension on the rotor shaft 54 to maintain the rotor 55 in operative driven engagement with the ribbed wheel 20 as shown in FIG. 2 for actuating the feeder 50. As grass is cut, the clippings tend to be raised by the blades and delivered upwardly and rearwardly over the curvilinear surfaces 36 and 42 and through the discharge port 41 of the auxiliary casing 40, aided in their upward and rearward movement by the rotary feeder 50 just described.

The catcher as herein shown is made and operated as follows:

The catching container generically designated by reference character 65 has a bottom 66 desirably made of metal rolled into a bead 67 at its forward margin to receive the transverse portion 68 of a U-shaped wire stay 69 having upright arms 70 and 71.

The bottom 66 of the catcher is enclosed about both sides and the rear by walls desirably comprising a strip of netting 73 of sufficiently small mesh to retain the clippings while permitting the escape of any air that may be entrained with the clippings. The net is bound about its bottom margin with a strip of cloth 74 attached to the bottom 66. While any means of attachment may be used, FIG. 4 shows a preferred arrangement whereby the cloth strip 74 has its lower margin clamped in a reversely folded flange 75 of the metal bottom 66.

The front marginal portions of the strip of net 73 which forms the side and rear walls of the receptacle 65 are also bound in cloth strips 77 folded upon themselves as clearly shown in FIG. 10 to provide hems which embrace the arms 70 and 71 of the U-shaped stay 68.

The top margin of the strip of net 73 is also reinforced by a cloth strip 79 folded upon itself to provide a hem for a U-shaped stay 80 which is continuous about the back and forwardly along the sides of receptacle 65. Stitched or otherwise fastened interiorly to the reinforcing band of cloth at 78 is a cloth top closure 81 which is cut to provide openings at 82 and 83 for the mower handle 85 as best shown in FIGS. 1 and 10. Snap fastener elements 86 on the central tongue 87 of this cloth top closure 81 are engageable with complementary snap fastener elements 88 on the forward reinforcing bands 77 whereby the openings 82 and 83 can be opened for the insertion or removal of the grass catching container 65 respecting handle 85 and can be closed about the handle as shown in FIG. 1.

Clips 89 at the rear of the receptacle bottom 66 pivotally engage the central portion of a third U-shaped stay 90 which extends diagonally toward the top front portion of the receptacle. The free end portions 91 of the horizontal top stay 80 are bent at right angles to project outwardly away from each other as best shown in FIGS. 10 to 12. The upper end portions of the diagonal stay 90 have eyes at 92 through which the free end portions 91 project. Similar eyes 93 on the upwardly extending arms 70 and 71 of the forward stay 69 are also engaged on the outwardly projecting free ends 91 of the top horizontal stay 80. The arrangement is such that the three stays are pivotally movable with respect to each other, the stays 69 and 90 pivoting on the free end portions 91 of stay 80. The assembly is releasably maintained by means of a so-called wedge nut 95 which, as best shown in FIG. 12, is interiorly provided with tongues 96 that engage the respective free end portions 91 to maintain the pivotal association of the three stays as above described.

The loops 97 formed in the U-shaped top stay member 80 adjacent its respective free end portions 91 are connected by a top front transverse stay member 98 which has hooked end portions 99 engaged in the respective loops as best shown in FIGS. 1 and 2. This top transverse stay member is positioned and supported pivotally on a notched bracket 100 mounted on top of the auxiliary casing 40 (FIGS. 5, 1, 2 and 4).

A pair of pivotally connected suspension links 101, 102 supports the grass catching container 65 at the rear, the link 101 being connected to the handle 85 and the link 102 being pivoted to link 101 and to the catching container 65 by engagement about the upper stay member 80 as best shown in FIGS. 1 and 4. Deflector 103 held by bracket 100 guides clippings into container 65.

A manually operable rope 105 provided with a handle 106 is fastened by link 107 to the bottom 66 of the receptacle at the rear thereof and can be pulled as shown in FIG. 7 to pivot the receptacle bodily upwardly and rearwardly for the discharge of its contents whenever desired. The receptacle is free to move to the position shown in FIG. 7, portions thereof between the diagonal stay 90 and the top stay 80 collapsing when the bottom is tilted upwardly and rearwardly. There is no physical connection between the bottom of the receptacle and the rear of the mower. When the rope 105 is released, the parts revert by gravity to the position shown in FIGS. 1 and 4, the forward lower margin of the receptacle as defined by the horizontal transverse portion 68 of the forward stay 69 being received onto the flange 45 as best shown in FIGS. 3 and 4.

The catching container as described is readily collapsed for shipment. As erected, the several stays have relatively pivotal movement to accommodate all necessary manipulation between the receiving position of FIGS. 1 and 4 and the dumping position of FIG. 7.

It will be observed that the blade housing is continuous about the path of the blade, having no lateral discharge ports through which sticks or stones can be hurled by the blade, or through which the blade is exposed for injury of a child or other person reaching into the housing through such a port. All clippings or other material acted upon by the blade must change direction twice in passing from the blade housing to the catching receptacle 65. The blades tend to propel any such material tangentially but their trailing margin flanges 24 tend to lift severed clippings. In any event, the direction of motion imparted to such material by the blades in such that the material is thrown against the vaned face of the rotary feeder 50. This feeder operates in a direction to discharge the material rearwardly into the receiver 65. Even a blade-propelled stone would have most of its energy absorbed before it ever leaves the auxiliary casing 40 and the receiver 65 is well adapted to yield upon impact of any such object and to absorb the rest of its energy.

The helical flange 52 on the rear face of the feeder 50 prevents any accumulations of grass clippings from lodging behind the feeder.

I claim:

1. In a mower having a rotary blade, the combination with a blade housing completely enclosing the path of such blade and provided with an upwardly opening outlet port, of means enclosing the upwardly opening outlet port and having a rearwardly facing discharge opening, and a rotary feeder within said port enclosing means, the means enclosing the port comprising an auxiliary casing having a side wall, the feeder having a supporting and driving shaft extending through the side wall, bracket means provided with bearings for the shaft, the bracket means having a pivotal connection with the side wall, the mower having a wheel underlying the shaft, the shaft having a driven rotor engaging the wheel to receive motion therefrom for driving the feeder.

2. In a rotary lawn mower having a blade enclosing casing provided with a top outlet port and supporting wheels, one of which is laterally adjacent said port, the combination with a rotary feeder operating over said port to engage material discharged therethrough, of a shaft on which the feeder is mounted, said shaft projecting over the wheel, a driven rotor on the shaft in engagement with the wheel for communicating motion from the wheel to the feeder, a bracket provided with spaced bearings for said shaft, means providing a pivotal connection for the bracket in proximity to the feeder, and means biasing toward said wheel the end of the bracket proximate the wheel whereby to maintain said rotor in pressure engagement with the wheel.

3. The device of claim 2 in further combination with a casing partially enclosing the port and having a wall through which said shaft extends, the feeder being within the casing last mentioned, the pivotal connection for the bracket being a connection between the bracket and the casing last mentioned.

4. The device of claim 3 in which such pivotal connection comprises a lug projecting from the casing, the bracket having openings that receive the lugs, and means for retaining the bracket upon the lugs, said openings providing sufficient clearance to accommodate pivotal movement of the bracket respecting the lugs.

5. The device of claim 4 in further combination with elastomeric cushion means compressed between the bracket and the casing and means on the lugs interiorly engaged with the bracket to hold the bracket in a position in which said cushion means are compressed.

6. In a device of the character described, the combination with a wall member and a bracket member, one of said members having lug means and the other being apertured and engaged with said lug means, whereby a pivotal connection is provided between said members, a shaft having spaced bearings in said bracket member and projecting through said wall member, a feeder mounted on the shaft within the wall member, a rotor on the shaft remote from the feeder and adapted to partake of the pivotal movement of the bracket member respecting the wall member, a driving wheel with which said rotor is operatively engaged to receive motion and means for biasing the bracket member in a direction to assure engagement of the rotor with the driving wheel.

7. The device of claim 6 in which an elastomeric cushion is compressed between the bracket member and the wall member and the lug means has a retaining device engaged with the member to which the lug means extends, said retaining device being adapted to maintain the cushion under compression while maintaining the assembly of said members.

References Cited in the file of this patent

UNITED STATES PATENTS

| | | |
|---|---|---|
| 1,126,109 | Smith | Jan. 26, 1915 |
| 1,622,611 | Sera | Mar. 29, 1927 |
| 2,020,361 | Johnston | Nov. 12, 1935 |
| 2,595,420 | Smola | May 6, 1952 |
| 2,670,587 | Larrowe | Mar. 21, 1954 |
| 2,770,088 | McNamara | Nov. 13, 1956 |
| 2,882,668 | Murillo | Apr. 21, 1959 |
| 2,984,961 | Judkins | May 23, 1961 |